Feb. 15, 1938.   V. B. EDWARDS   2,108,433
FLEET TESTING DYNAMOMETER
Filed Jan. 26, 1937   4 Sheets-Sheet 1
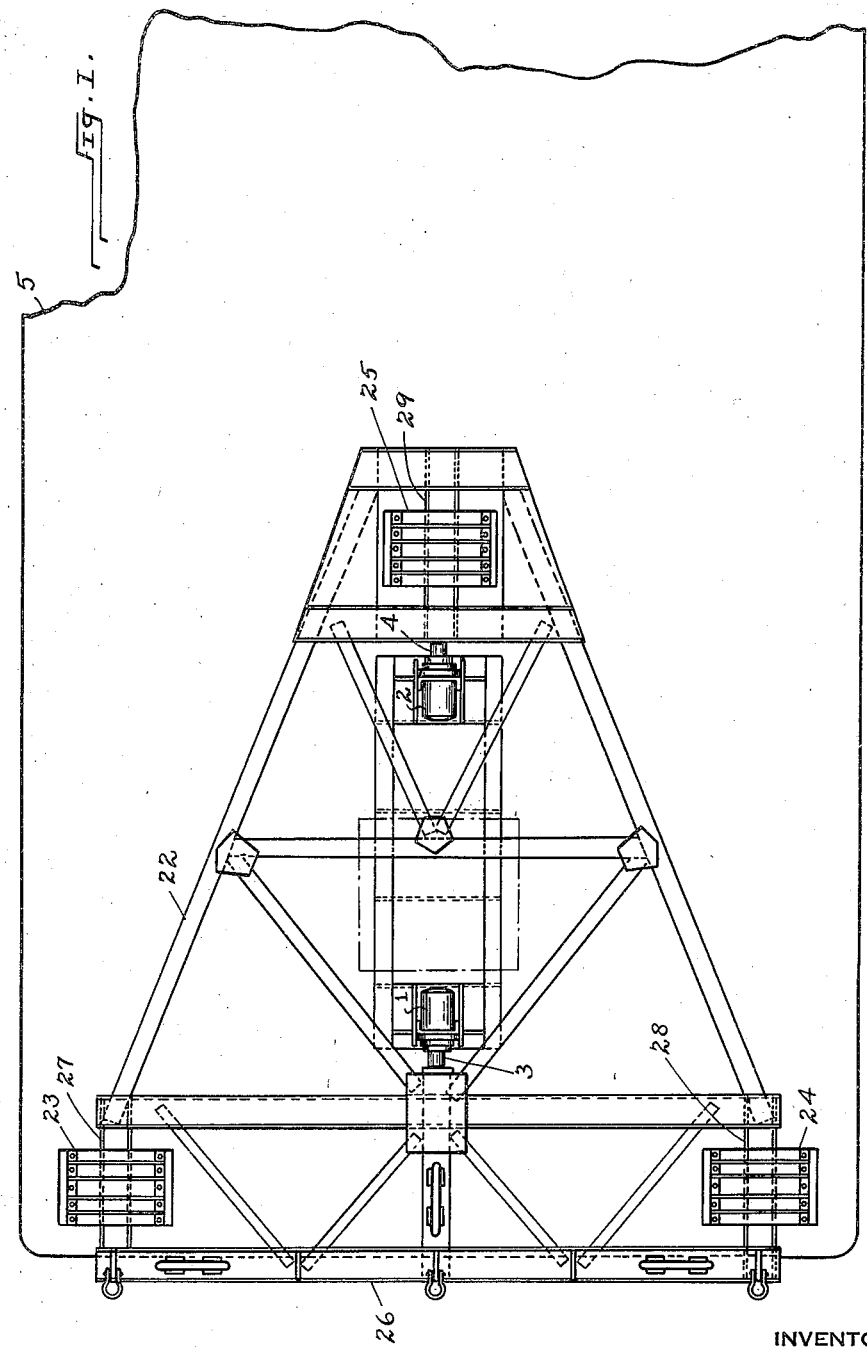
INVENTOR
Vere B. Edwards
BY Christy and Wharton
his ATTORNEYS

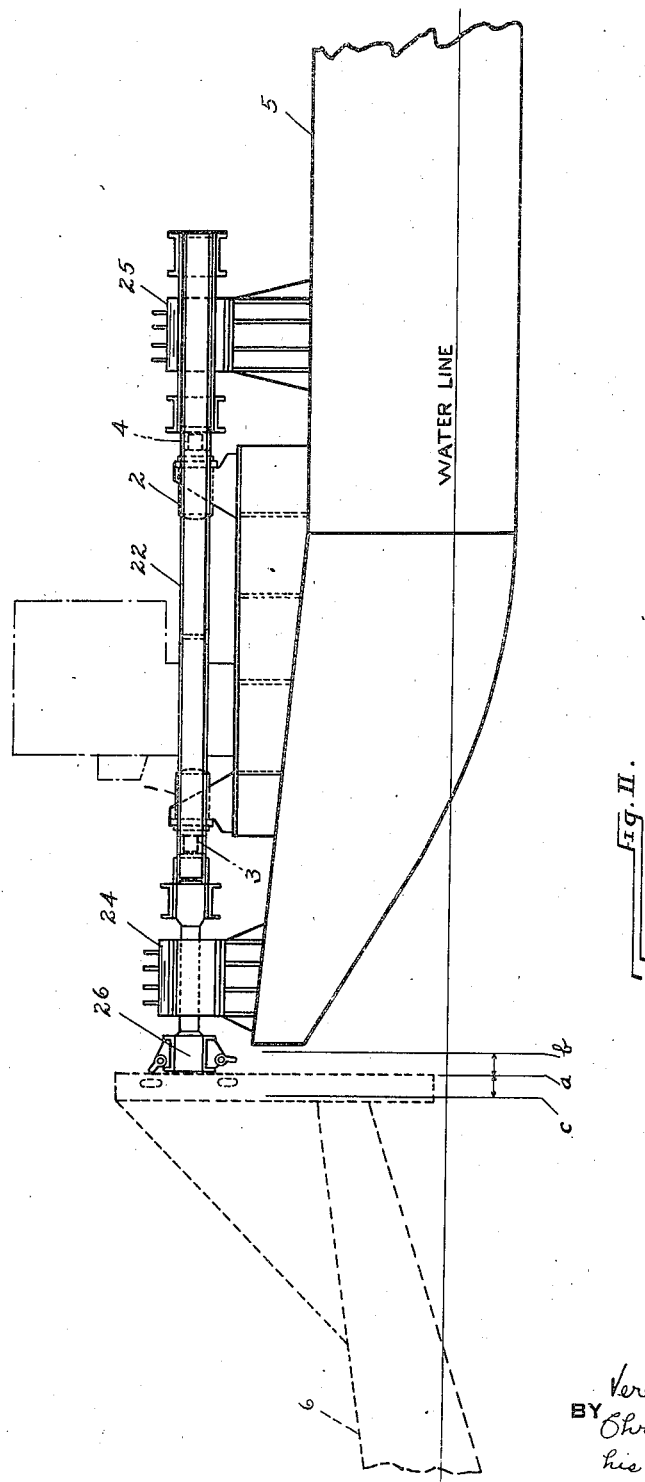
Fig. II.

Feb. 15, 1938.  V. B. EDWARDS  2,108,433
FLEET TESTING DYNAMOMETER
Filed Jan. 26, 1937  4 Sheets-Sheet 3
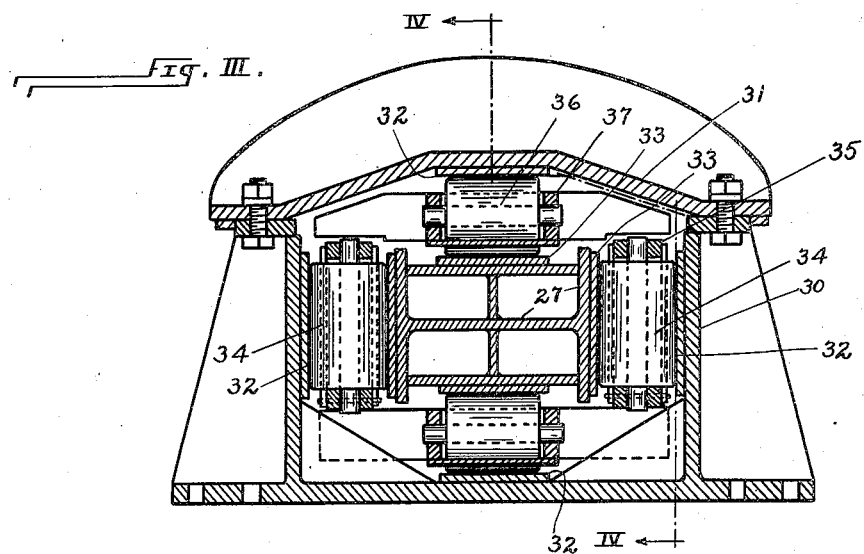
Fig. III.
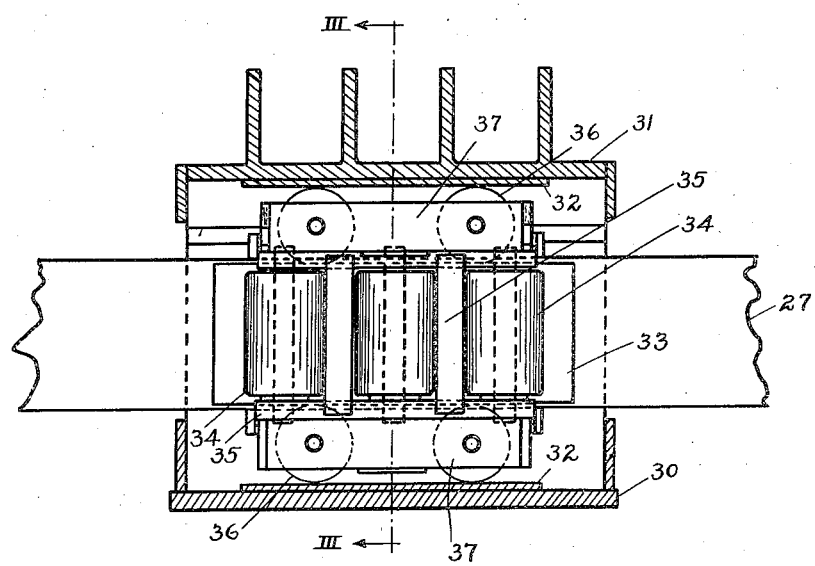
Fig. IV.
INVENTOR
Vere B. Edwards
BY Christy & Wharton
his ATTORNEYS

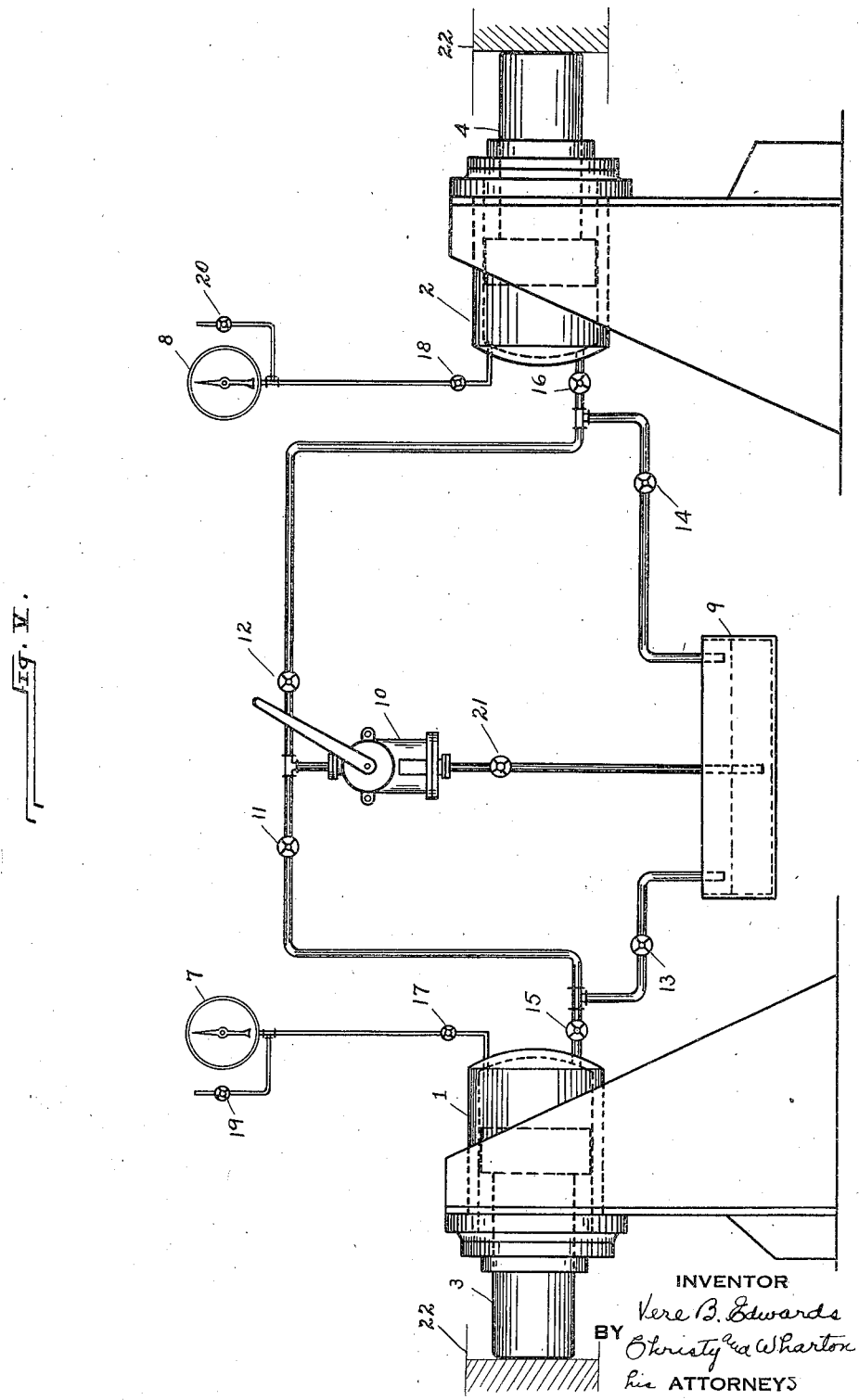

Patented Feb. 15, 1938

2,108,433

UNITED STATES PATENT OFFICE 2,108,433

FLEET TESTING DYNAMOMETER

Vere B. Edwards, Coraopolis, Pa., assignor to Dravo Corporation, a corporation of Pennsylvania Application January 26, 1937, Serial No. 122,389

3 Claims. (Cl. 265—1)

This invention relates to fleet-testing dynamometers and consists in a frame adapted to shift the movable dynamometer part or parts, so disposed and so mounted as to reduce to minimum and negligible value the fraction of the towing-stress that is lost because of obliquity in direction, and to bring the towing-stress to bear in substantially full intensity directly upon the dynamometer. As is implicit in the name, a fleet-testing dynamometer is a dynamometer mounted between the driving and the driven units of a fleet of boats, and its office is to afford measure of the towing stress that is exerted.

In the accompanying drawings Fig. I is a fragmentary view in plan of a barge (a driven unit) equipped with a dynamometer; a frame that engages the movable parts of this dynamometer constitutes in structure and in mounting an embodiment of the invention. Fig. II is a view in side elevation of the same assembly; and in this figure, to the left and in dotted lines, is indicated a second, driving unit (it may be understood to be a towboat for river navigation) united in fleet formation with the barge. Figs. III and IV are views to larger scale, showing in transverse and in longitudinal sections one of the bearing boxes in which the frame for shifting the movable dynamometer parts is mounted. The plane of section of Fig. III is in Fig. IV indicated by the dotted line III—III; and in Fig. III the (broken) plane of section of Fig. IV is indicated at IV—IV. Fig. V is a diagrammatic illustration of the essential parts of the assembled dynamometer, and of the organization of its stationary and movable parts.

Referring first to Fig. V, the dynamometer in this instance includes two oil-filled cylinders, 1 and 2, and two rams, 3 and 4. The cylinders are aligned on a common fore-and-aft axis on the mid-line of the barge, and are oppositely directed. One of the pairs of relatively movable members, in this instance the cylinders, is rigidly mounted in the barge 5 adjacent the stern; while the other pair of members, the rams, is responsive to stresses exerted by the towboat 6. Pressure gauges 7 and 8 are severally connected with the two cylinders; and in such an organization the gauges register the towing stress, whether in forward or rearward direction—diminished, however, by such loss as may be incident to the assembly.

Means for charging the dynamometer cylinders with oil include an oil-supply tank 9, a pump 10, a valve-controlled pipe leading from tank to pump, valve-controlled pipes leading from pump to cylinders, valve-controlled pipes leading from cylinders to tank, valve-controlled pipes leading from cylinders to pressure gauges, and valve-controlled vents for the pipes last named. Assuming the cylinders to be empty, they are filled in the following manner—Valves 21, 11, 14, 15, 16, 17, and 19 are opened, while valves 12, 13, and 18 are closed. The pump then is operated and oil is forced from the tank into cylinder 1 and its gauge pipe. The two rams 3 and 4, that are mounted in the manner presently to be described for integral reciprocation are driven aft (that is to say, to the left, Fig. V). When the cylinder 1 is thus filled the operation of the pump is arrested and the valve 19 is closed. Valves 11, 14, and 17 then are closed, valves 12 and 13 opened, and valves 18 and 20 are opened. Further operation of the pump then fills cylinder 2, while the oil that has filled cylinder 1 is driven into the oil-supply tank again. And again pump operation is continued until cylinder 2 and its gauge pipe are filled. Thereupon valve 20 is closed, valves 12, 13, and 18 closed; valves 11 and 14 opened again; and valves 17 and 19 opened again. The renewed operation of the pump refills cylinder 1 and empties cylinder 2. These alternate operations are repeated several times; and at length the pump is stopped with the two rams in the two cylinders in mid-position in their range of reciprocation; and then valves 11, 12, 13, 14, 15, 16, 19, 20, and 21 all are closed; and valves 17 and 18 alone remain open. The dynamometer then is in operative condition. When all the valves are opened the cylinders and the pipe connections drain by gravity to the oil-supply tank 9.

A frame 22, having advantageously the essentially isosceles triangular shape shown in Fig. I, is mounted in three bearing boxes 23, 24, and 25 that are arranged two of them symmetrically on opposite sides of and at the stern of the barge, and the third on the mid-line of the barge, remote from the stern, and preferably forward of the dynamometer. The frame includes a member 26 that in this instance forms the base of the triangle to which the frame is shaped, and that in the assembly extends transversely and projects aft, beyond the stern of the barge. The barge in this instance is square ended, and the basal member of the frame extends throughout substantially the breadth of the barge. The frame includes also three fore-and-aft extending members, 27, 28, and 29, that extend through the bearing boxes 23, 24, and 25, and upon these members, so borne, the frame is wholly sustained. The frame abuts snugly upon the distal ends of rams 3 and 4, as is indicated in Figs. I, II, and V.

The members 27, 28, and 29 are, essentially, beams so constructed as to sustain the strains of operation. Turning to Figs. III and IV, the bearing boxes will be seen to consist of strong housings 30 adapted to be rigidly mounted on the deck of the barge and provided with removable covers 31. The boxes are rectangular and their inner walls are faced with bearing strips 32. Through the open ends fore and aft of the bearing boxes the beam 27 extends. The beam is correspondingly rectangular, and it is faced with bearing strips 33. Within the bearing box and between the four pairs of bearing strips 32 and 33, oppositely disposed, as shown in Fig. III, four sets of anti-friction rollers are assembled. Since in service the stresses in transverse direction are heavier than those in vertical direction, the lateral sets of rollers are advantageously made heavier than the sets above and below. Each lateral set as here shown consists of three relatively long rollers 34 carried in a frame 35, while each of the sets arranged above and below consists of two relatively short rollers 36 carried in a frame 37.

Turning again to Figs. I and II it will be seen that the barge equipped with a dynamometer and an operating frame 22 may by its transverse and projecting member 26 be secured to a towboat, so that the frame becomes integral with the towboat, and through it the towboat tows the barge, whether forward, backward, or laterally. In towing, the direction of stress is in approximately fore-and-aft direction. In consequence, however, of inequalities of loading and in the make-up of the fleet; and in consequence of the influences of water currents and of winds, and the necessity of steering now to starboard and again to port, the resistance that the towboat has to overcome is not aligned with the keel of the towboat. In such case the thrust is borne in part by the frictional engagement of driving and driven parts, and the stress to which the dynamometer is actually responsive is the towing stress reduced by a large and widely varying minuend. By the use of the frame of my invention this minuend is made small and relatively negligible and its range of variability rendered insignificant, and the dynamometer is rendered effective to give adequate indication of towing force under varying service conditions.

In Fig. II the vertical line $a$ indicates the plane in which the frame and towboat meet so long as the fleet continues at rest; and, when towing is in progress, the displacement of this plane relatively to the barge is negligible. The lines $b$ and $c$ illustrate the interval through which the frame 22 reciprocates while the cylinders 1 and 2 are being alternately filled and emptied in preparation for testing.

The barge 5 shown in the drawings may be understood to typify the tow, that is to say, in the parlance of navigation, the driven unit of a fleet. A single barge will ordinarily be aligned fore and aft with the towboat and the towing stresses will not depart widely from the keel-line of the towboat; but to the barge 5 other barges may be lashed; the barge 5 may be but one of many barges united to constitute the driven unit; and the line of resistance to the towing stress may be far to one side of the mid-line of barge 5 and far to one side of the keel-line of the towboat. And in all such cases the structure of the invention is effective to concentrate the resistance to the towing stress in fullest measure upon the dynamometer.

It will be manifest from the drawings that the invention has been developed in the field of river navigation, where barges are commonly lashed to the bows of towboats and are pushed by the advancing towboat. It is applicable wherever the floating body to be towed is lashed to the towboat. Manifestly, also, the same effect may be had if the towboat carries the dynamometer and the frame while to the transverse member of the frame the barge is lashed; as a matter of convenience, however, the arrangement is preferably that shown in the drawings.

I claim as my invention:

1. A dynamometer structure adapted to be employed between a towing unit and a towed unit, such structure including in association with a dynamometer adapted to be mounted on one of said units, said dynamometer including a member movable in fore-and-aft direction, a pair of bearings adapted to be mounted on the same unit with the dynamometer and spaced apart transversely of the fore-and-aft line through said movable member, a frame including two spaced apart fore-and-aft extending members which members are mounted in said bearings and are movable therein in fore-and-aft direction, the said frame being adapted to engage the said movable member of the dynamometer, said frame also including a member extending transversely of such fore-and-aft line and adapted to be engaged by the other of the two units first named.

2. A dynamometer structure adapted for use between a towboat and a tow, such structure including, in association with a dynamometer adapted to be mounted on the tow, said dynamometer including a member movable in fore-and-aft direction relatively to said tow, three bearings adapted to be mounted on said tow in triangular formation, one on the line of fore-and-aft movement of said dynamometer member and two on opposite sides of such line, and a frame mounted in said bearings and movable in such mounting in fore-and-aft direction and engaging said dynamometer member, the frame including a transversely extending member adapted to be engaged by a towboat.

3. A dynamometer structure adapted for use between a towboat and a tow, including, in association with a dynamometer adapted to be mounted on said tow on the mid fore-and-aft line thereof, said dynamometer including two rams adapted to be driven the one forwardly the other rearwardly in such fore-and-aft line, three bearings adapted to be mounted on said tow in triangular formation, one forwardly of the others and on the mid fore-and-aft line, and the others on opposite sides of such fore-and-aft line and adjacent the stern of the tow, and a frame mounted in said bearings and movable in fore-and-aft direction in such mounting and adapted to engage in its fore-and-aft movement one and the other of the two said rams, said frame in the assembly projecting beyond the stern of the tow and including a transverse member defining the limit of its sternward extension and adapted to be engaged by a towboat.

VERE B. EDWARDS.